(12) United States Patent
Xu et al.

(10) Patent No.: US 8,677,223 B2
(45) Date of Patent: Mar. 18, 2014

(54) TAIL-BITING CONVOLUTIONAL CODES FOR UPLINK FAST FEEDBACK CONTROL CHANNEL

(75) Inventors: Changlong Xu, Beijing (CN); Hongmei Sun, Beijing (CN); Jong-Kae Fwu, Sunnyvale, CA (US); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 12/799,634

(22) Filed: Apr. 28, 2010

(65) Prior Publication Data

US 2010/0287452 A1    Nov. 11, 2010

Related U.S. Application Data

(60) Provisional application No. 61/173,204, filed on Apr. 28, 2009.

(51) Int. Cl.
   *H03M 13/03*    (2006.01)
(52) U.S. Cl.
   USPC .......................................................... 714/786
(58) Field of Classification Search
   None
   See application file for complete search history.

(56) References Cited

U.S. PATENT DOCUMENTS

| | | | |
|---|---|---|---|
| 8,397,147 B2* | 3/2013 | Chen et al. ..................... | 714/795 |
| 2004/0081073 A1* | 4/2004 | Walton et al. ................. | 370/204 |
| 2006/0039275 A1* | 2/2006 | Walton et al. ................. | 370/208 |
| 2006/0156199 A1* | 7/2006 | Palanki et al. ................ | 714/776 |
| 2008/0016425 A1* | 1/2008 | Khan et al. .................... | 714/755 |
| 2009/0067543 A1* | 3/2009 | Hsiao et al. ................... | 375/298 |
| 2010/0169747 A1* | 7/2010 | Chen et al. .................... | 714/781 |
| 2010/0208841 A1* | 8/2010 | Walton et al. ................. | 375/295 |
| 2010/0265865 A9* | 10/2010 | Vijayan et al. ................ | 370/312 |

* cited by examiner

*Primary Examiner* — Guerrier Merant
(74) *Attorney, Agent, or Firm* — Thorpe North & Western, LLP

(57) ABSTRACT

An apparatus and method for processing fast feedback payload data to generate symbols for transmission through a fast feedback channel in a wireless network are presented. The technique first encodes payload data using a tail biting convolutional code. The encoded bits are then de-multiplexed to five different data subblocks in a sequential fashion. Subblock interleaving is then used to interleave the data of the subblocks according to a predetermine scheme. A bit selector then selects interleaved subblock bit for output. The selected bits may then be modulated by a modulator using quadrature phase shift keying (QPSK). The resulting symbols may then be mapped to a predetermined fast feedback subcarriers within a feedback channel.

13 Claims, 5 Drawing Sheets

TAIL-BITING CONVOLUTIONAL CODES FOR UPLINK FAST FEEDBACK CONTROL CHANNEL

The present application claims the benefit of previously filed provisional patent application Ser. No. 61/173,204, filed on Apr. 28, 2009 which is co-owned with the present application.

TECHNICAL FIELD

The invention relates generally to channel coding and, more particularly, to channel coding techniques for use in a wireless channel.

BACKGROUND OF THE INVENTION

When performing channel adaptation within a multicarrier wireless channel, a feedback channel is often used to provide a feedback of channel information. Techniques for providing channel coding within such a feedback channel are needed that perform well and are of low complexity.

DETAILED DESCRIPTION

Figure 1:
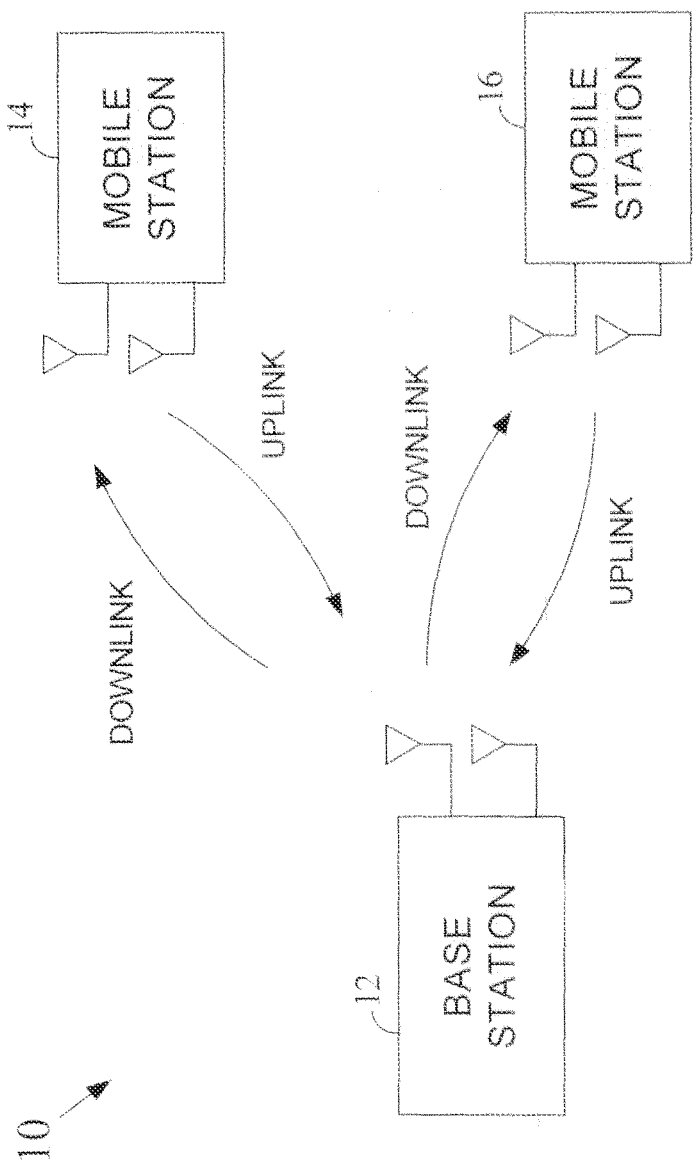
FIG. 1 is a block diagram illustrating a wireless network arrangement that may utilize aspects of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating a wireless network arrangement 10 that may utilize aspects of the present invention. As shown in the figure, the wireless network arrangement 10 includes a wireless base station 12 that is communicating wirelessly with multiple wireless mobile stations 14, 16. As is the convention, communication from the base station 12 to the mobile stations 14, 16 will be referred to herein as downlink communication and communication from the mobile stations 14, 16 to the base station 12 will be referred to as uplink communication. Although illustrated with two mobile stations, it should be understood that more or less mobile stations may be communicating with a base station at a particular point in time. In the illustrated embodiment, the base station 12 and the mobile stations 14, 16 each have multiple antennas. Multiple input, multiple output (MIMO) communication techniques may therefore be used within the wireless network arrangement 10. In addition, multicarrier communications techniques (e.g., orthogonal frequency division multiplexing (OFDM), orthogonal frequency division multiple access (OFDMA), etc.) may also be implemented within the wireless network arrangement 10.

In some wireless systems, the downlink channel between a base station and mobile station may support multiple transmission modes. In addition, the transmission mode of the downlink channel may adapt over time based on channel and traffic conditions. When an adaptive downlink channel is used, a fast feedback channel may be provided from the mobile station to the base station to allow feedback of channel quality data (e.g., channel quality indicator, etc.) for use in adapting the channel. The fast feedback channel may also be used to feedback MIMO related information to the base station to support downlink adaptation. Desirably, channel coding should be used to enhance the accuracy of the communication within the fast feedback channel. The channel coding should provide good performance while also being relatively low complexity. In at least one aspect of the present invention, a tail-biting convolutional coding technique is provided that is well suited for use within a wireless fast feedback channel. With reference to FIG. 1, the tail-biting convolutional coding technique may be used to code feedback information being uplinked from, for example, the mobile station 16 to the base station 12. Other applications also exist.

Figure 2:
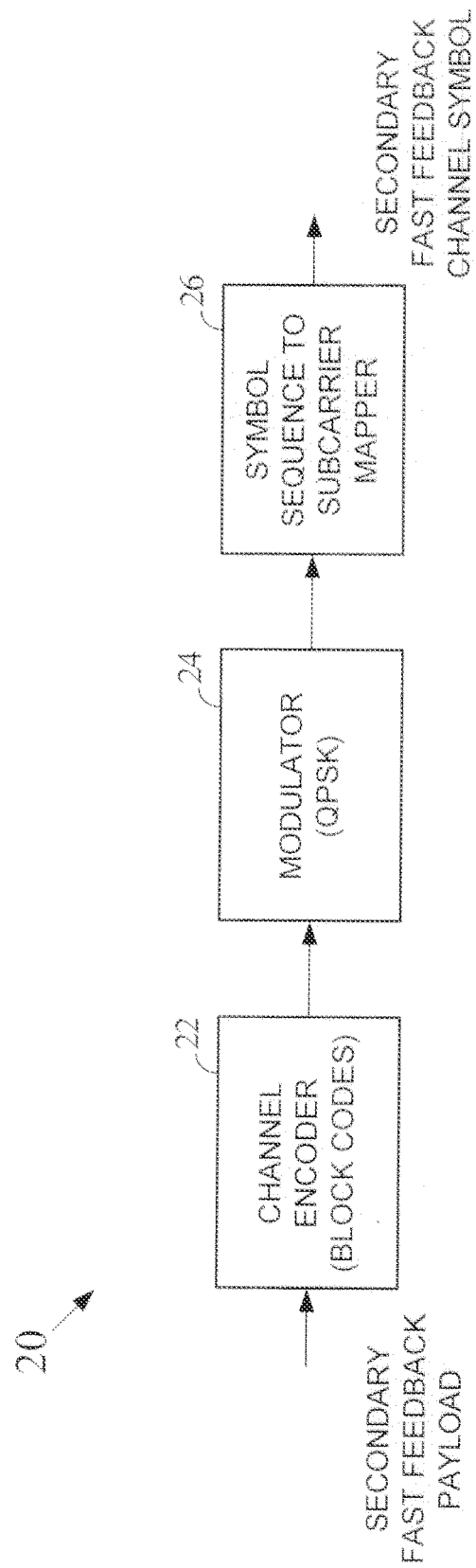
FIG. 2 is a block diagram illustrating a system for processing fast feedback payload data to generate symbols for transmission through a fast feedback channel in accordance with an embodiment of the present invention.

FIG. 2 is a block diagram illustrating a system 20 for processing fast feedback payload data to generate symbols for transmission through a fast feedback channel in a wireless network in accordance with an embodiment of the present invention. First, the fast feedback payload data is encoded in a channel encoder 22 that uses a tail biting convolutional code. The coded output sequence is then modulated in the modulator 24 using quadrature phase shift keying (QPSK). The modulated symbols are then combined with a pilot sequence and the resulting symbol sequence is mapped to data subcarriers, in a mapper 26, for transmission through the fast feedback channel.

In at least one embodiment, the payload data consists of l information bits $a_0\ a_1\ a_2 \ldots a_{l-1}$. These bits are encoded to M bits $b_0\ b_1\ b_2 \ldots b_{M-1}$ using the channel encoder 22, which is described in greater detail below. When $l \leq 12$, the information bits $a_0\ a_1\ a_2 \ldots a_{l-1}$ are encoded using a linear block code (N,l). When $12 < l \leq 24$, the information bits $a_0\ a_1\ a_2 \ldots a_{l-1}$ are split into two parts; namely, Part A consisting of $$a_0 a_1 a_2 \ldots a_{\lfloor \frac{l}{2} \rfloor - 1}$$

and Part B consisting of $$a_{\lfloor \frac{l}{2} \rfloor} a_{\lfloor \frac{l}{2} \rfloor+1} a_{\lfloor \frac{l}{2} \rfloor+2} \ldots a_{l-1}.$$

Part A is encoded to $$\frac{N}{2} \text{ bits} \left(b_0 b_1 b_2 \ldots b_{\frac{N}{2}-1}\right)$$

using linear block code $$\left(\frac{N}{2}, \left\lfloor \frac{l}{2} \right\rfloor\right)$$

and Part B is encoded to $$\frac{N}{2} \text{ bits} \left(b_{\frac{N}{2}} b_{\frac{N}{2}+1} b_{\frac{N}{2}+2} \ldots b_{N-1}\right)$$

using a linear block code $$\left(\frac{N}{2}, l - \left\lfloor \frac{l}{2} \right\rfloor\right).$$

The values of parameters L and M are set to 1 and 60, respectively. The value of $K_{bufsize}$ may be set as follows:

$$K_{bufsize} = \begin{cases} 30 & l = 7, 8, 9 \\ 5l & l = 10, 11 \\ 60 & 12 \leq l \leq 24 \end{cases}$$

The coded sequence $b_0 \, b_1 \, b_2 \ldots b_M$ is then modulated to $$\frac{M}{2} \text{ symbols} \left(c_0 c_1 c_2 \ldots c_{\frac{M}{2}-1}\right)$$

in the modulator 24 using QPSK. The modulated symbols $$c_0 c_1 c_2 \ldots c_{\frac{M}{2}-1}$$

and the pilot sequence are then combined to form symbol sequence $d_0 \, d_1 \, d_2 \ldots d_{35}$ which is then mapped by the mapper 26 to the data subcarriers of the fast feedback channel.

As described above, the channel encoder 22 of FIG. 2 encodes the fast feedback payload data using a tail biting convolutional code. Various coding rates may be used. In at least one embodiment, a tail biting convolutional code of rate 1/5 and a constraint length of K=7 is used. This tail biting convolutional code uses the following generator polynomials to generate its five coded bits:

$G_1 = 171_{OCT}$
$G_2 = 133_{OCT}$
$G_3 = 165_{OCT}$
$G_4 = 117_{OCT}$
$G_5 = 127_{OCT}$

Figure 3:
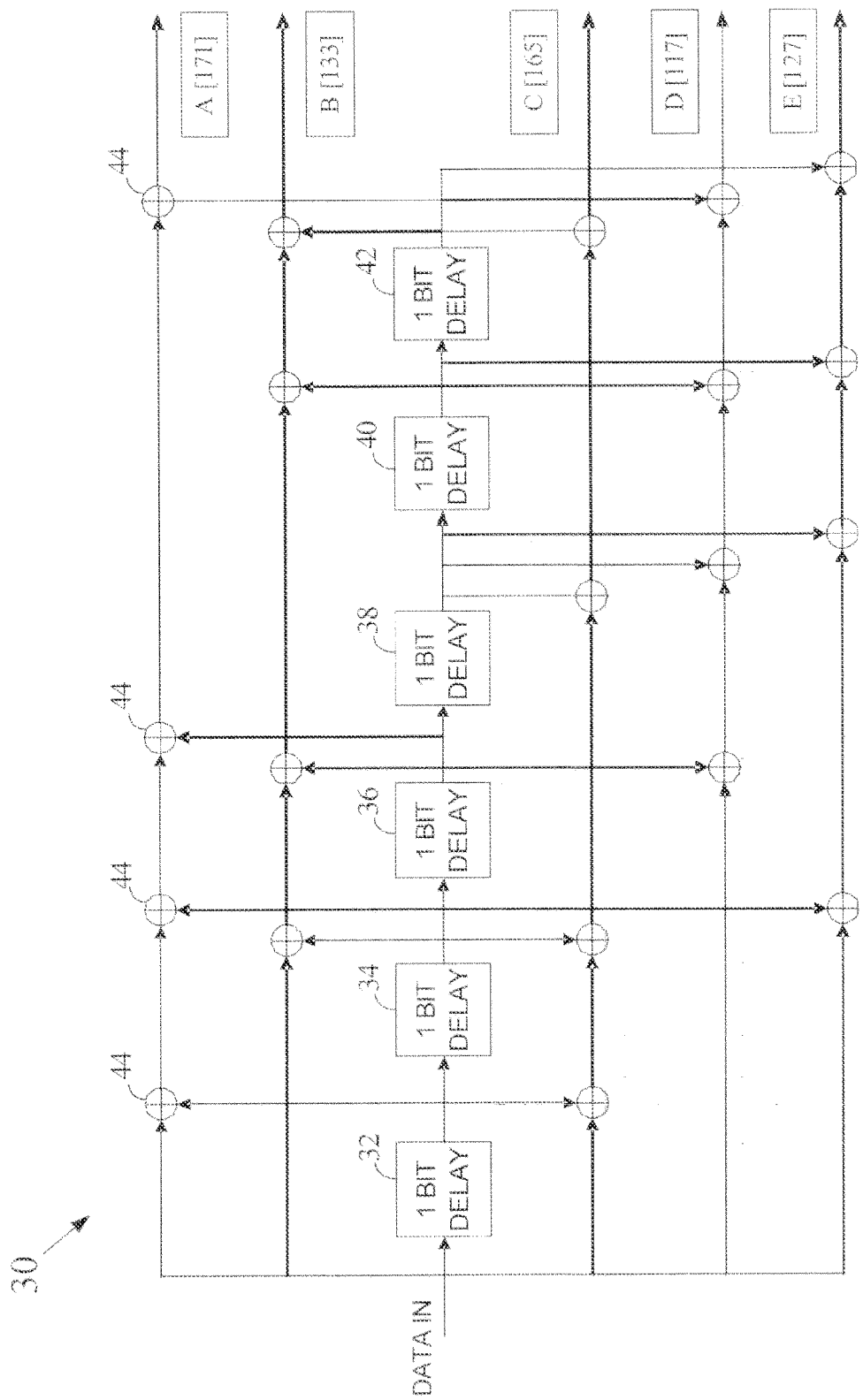
FIG. 3 is a diagram illustrating a generator for use in generating a tail biting convolutional code of rate 1/5 and a constraint length of K=7 in accordance with an embodiment of the present invention.

FIG. 3 is a diagram illustrating a generator 30 for use in generating this code. As illustrated, the generator 30 includes six 1-bit delay units (shift registers) 32, 34, 36, 38, 40, 42 and twenty modulo-2 adders 44.

Figure 4:
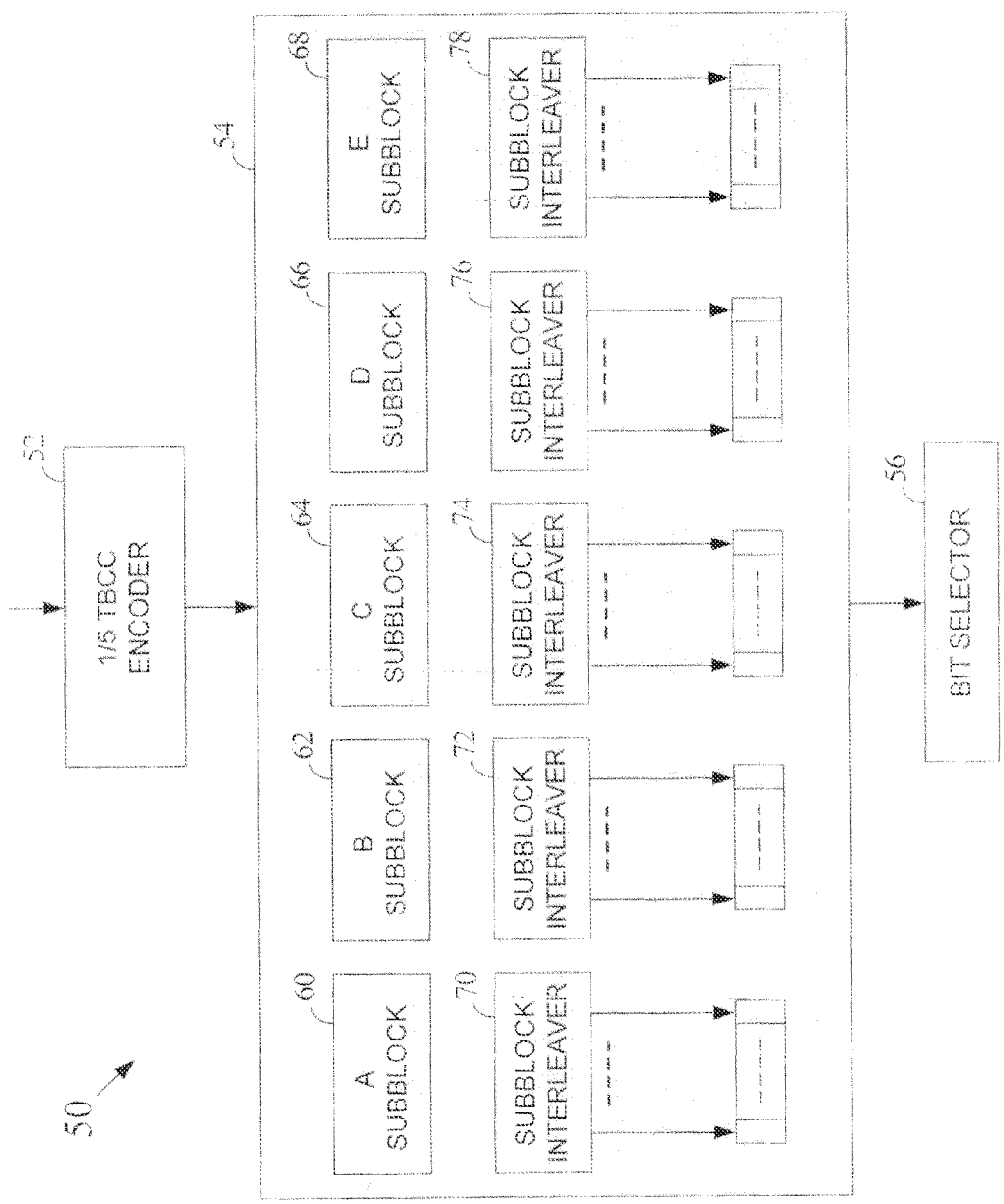
FIG. 4 is a block diagram illustrating a channel encoder that uses a tail biting convolutional code of rate 1/5 and constraint length of K=7 in accordance with an embodiment of the present invention.

FIG. 4 is a block diagram illustrating a channel encoder 50 that uses the tail biting convolutional code of rate 1/5 and constraint length of K=7 in accordance with an embodiment of the present invention. The channel encoder 50 of FIG. 4 may be used, for example, as the channel encoder 22 of FIG. 2. As shown in FIG. 4, the channel encoder 50 includes a rate 1/5 tail biting convolutional code encoder 52, a channel interleaver 54, and a bit selector 56. The rate 1/5 tail biting convolutional code encoder 52 receives an input data block and encodes the block using the 1/5 tail biting convolutional code. The resulting encoded bits are then demultiplexed into five subblocks, denoted A subblock 60, B subblock 62, C subblock 64, D subblock 66, and E subblock 68 in FIG. 4. The five subblocks 60, 62, 64, 66, 68 may be implemented using, for example, one or more memory or digital storage devices. If the input data block has L information bits, for example, the encoder output bits will be sequentially distributed into the five subblocks 60, 62, 64, 66, 68 with the first L encoder output bits going to the A subblock 60, the second L encoder output bits going to the B subblock 62, the third L encoder output bits going to the C subblock 64, and so on. The subblock data bits are then delivered to corresponding subblock interleavers 70, 72, 74, 76, and 78 for subblock interleaving. A table for interleaving index with length of 128 entries may be generated as follows:

$$x = 1:128$$

$$\text{index} = (15x + 32 \times 2) \bmod 128 + 1.$$

When the number of information bits is less than 128, the corresponding index table can be generated by removing the entries whose values are larger than the number of information bits. The channel interleaver output sequence shall consist of the interleaved A and B subblock sequences, followed by interleaved C, D, and E subblock sequences.

If L information bits are input to the encoder 52 of FIG. 4, the output sequence of the channel interleaver 54 will consist of 5 L bits denoted as $d_i$, i=0, 1, . . . , 5 L. Parameter $K_{bufsize}$ is used to indicate the size of the buffer used for repetition. The buffer size is not larger than 5 L. If the output bits are M, the output sequence can be expressed as $c_j = d_{j \bmod K_{bufsize}}$, j=0, 1, . . . , M.

Figure 5:
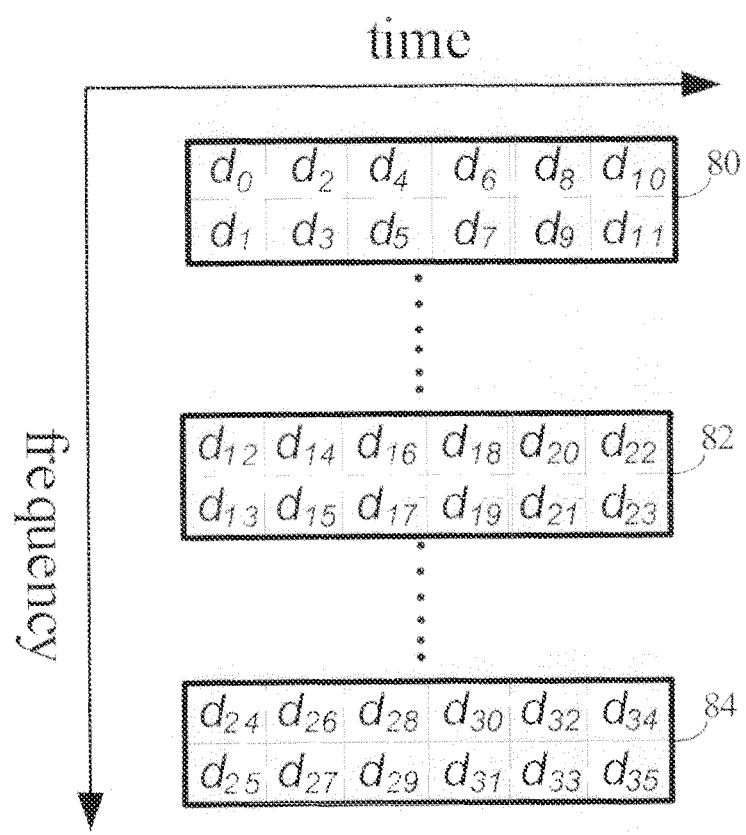
FIG. 5 is a diagram illustrating three distributed FMTs that may carry a mapped symbol sequence $d_0\ d_1\ d_2\ \ldots\ d_{35}$ in accordance with an embodiment of the present invention.

In at least one embodiment, the fast feedback channel consists of 3 distributed FMTs with 2 pilots allocated in each FMT. As described previously in connection with FIG. 2, the modulated symbols output by the modulator $$24 \, c_0 c_1 c_2 \ldots c_{\frac{M}{2}-1}$$

are combined with a pilot sequence and the resulting symbol sequence $d_0 \, d_1 \, d_2 \ldots d_{35}$ is mapped to data subcarriers of the fast feedback channel in the mapper 26. These data subcarriers are part of the 3 distributed FMTs. FIG. 5 is a diagram illustrating three distributed FMTs 80, 82, 84 that may carry the mapped symbol sequence $d_0 \, d_1 \, d_2 \ldots d_{35}$ in accordance with an embodiment of the present invention. As shown, the first FMT 80 has symbols d0 through d11 mapped across two subcarriers. Similarly, the second FMT 82 has symbols d12 through d23 and the third FMT 84 has symbols d24 through d35 mapped across two subcarriers each.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In at least one embodiment, the techniques of the present invention are partially or fully performed within one or more digital processing devices. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An apparatus comprising:
a channel encoder to encode payload data for transmission through a feedback channel, said channel encoder including:
  a tail biting convolutional code (TBCC) encoder to encode said payload data using a TBCC, said TBCC encoder generating encoded bits;
  a channel interleaver to demultiplex said encoded bits, in a sequential manner, into multiple subblocks, wherein the number of subblocks depends upon a tail biting convolutional coding rate of said TBCC encoder, said channel interleaver including a number of subblock interleavers to provide subblock interleaving on said multiple subblocks, said subblock interleaving following a predetermined interleaving index table; and
  a bit selector to select interleaved bits from outputs of said subblock interleavers and to provide these bits at an output for subsequent modulation;
a modulator to modulate encoded output data of said channel encoder using quadrature phase shift keying to generate modulated symbols; and
a symbol sequence to subcarrier mapper to map a sequence of symbols that includes said modulated symbols output by said modulator and multiple pilot symbols to predetermined feedback channel subcarriers, wherein said predetermined feedback channel subcarriers are arranged in three distributed feedback mini-tiles (FMTs) within an uplink feedback channel.

2. The apparatus of claim 1, wherein:
said TBCC is a rate 1/5 code having a constraint length of 7.

3. The apparatus of claim 1, wherein:
said number of subblocks of said channel encoder is 5.

4. The apparatus of claim 1, wherein:
said predetermined interleaving index table followed by said subblock interleaving is defined as follows:

$$x=1:128$$

$$\text{index}=(15x+32\times 2) \bmod 128+1.$$

5. The apparatus of claim 1, wherein:
said TBCC used by said TBCC encoder uses the following generator polynomials to generate its five coded bits:
$G_1=171_{OCT}$
$G_2=133_{OCT}$
$G_3=165_{OCT}$
$G_4=117_{OCT}$
$G_5=127_{OCT}$.

6. A computer implemented method comprising:
encoding a data payload for transmission through a channel using a tail biting convolutional code having a rate of 1/5 and a constraint length of 7 to generate encoded data;
demultiplexing said encoded data, in sequential fashion, into 5 data subblocks;
performing subblock interleaving on each of the 5 data subblocks based on a predetermined interleaving index table to generate interleaved subblocks; and
performing bit selection on said interleaved subblocks to provide bits for subsequent modulation;
modulating said selected bits using quadrature phase shift keying to generate modulated symbols; and
mapping a sequence of symbols that includes said modulated symbols and multiple pilot symbols to predetermined feedback channel subcarriers, wherein said predetermined feedback channel subcarriers are arranged in three distributed feedback mini-tiles (FMTs) within an uplink feedback channel.

7. The method of claim 6, wherein:
said predetermined interleaving index table used during subblock interleaving is defined as follows:

$$x=1:128$$

$$\text{index}=(15x+32\times 2) \bmod 128+1.$$

8. The method of claim 6, wherein:
said TBCC used during encoding a data payload uses the following generator polynomials to generate its five coded bits:
$G_1=171_{OCT}$
$G_2=133_{OCT}$
$G_3=165_{OCT}$
$G_4=117_{OCT}$
$G_5=127_{OCT}$.

9. The method of claim 6, wherein:
said sequence of symbols includes 36 symbols.

10. A non-transitory computer readable storage medium having computer executable instructions stored thereon that, when executed by a computing platform, perform the method:
- encoding a data payload for transmission through a channel using a tail biting convolutional code having a rate of 1/5 and a constraint length of 7 to generate encoded data;
- demultiplexing said encoded data, in sequential fashion, into 5 data subblocks;
- performing subblock interleaving on each of the 5 data subblocks based on a predetermined interleaving index table to generate interleaved subblocks; and
- performing bit selection on said interleaved subblocks to provide bits for subsequent modulation;
- modulating said selected bits using quadrature phase shift keying to generate modulated symbols; and
- mapping a sequence of symbols that includes said modulated symbols and multiple pilot symbols to predetermined feedback channel subcarriers, wherein said predetermined feedback channel subcarriers are arranged in three distributed feedback mini-tiles (FMTs) within an uplink feedback channel.

11. The non-transitory computer readable storage medium of claim 10, wherein:
said predetermined interleaving index table used during subblock interleaving is defined as follows:

$$x=1:128$$

$$\text{index}=(15x+32\times 2)\bmod 128+1.$$

12. The non-transitory computer readable storage medium of claim 10, wherein:
said TBCC used during encoding a data payload uses the following generator polynomials to generate its five coded bits:
$G_1=171_{OCT}$
$G_2=133_{OCT}$
$G_3=165_{OCT}$
$G_4=117_{OCT}$
$G_5=127_{OCT}$.

13. The non-transitory computer readable storage medium of claim 10, wherein:
said sequence of symbols includes 36 symbols.

* * * * *